United States Patent
Cao et al.

(10) Patent No.: US 9,657,172 B2
(45) Date of Patent: May 23, 2017

(54) FLAME RETARDANT THERMOPLASTIC POLYURETHANE COMPOSITIONS

(75) Inventors: Feina Cao, Canton, MI (US); Greg S. Nestlerode, Norton, OH (US); Qiwei Lu, Seven Hills, OH (US)

(73) Assignee: Lubrizol Advanced Materials, Inc., Cleveland, OH (US)

(*) Notice: Subject to any disclaimer, the term of this patent is extended or adjusted under 35 U.S.C. 154(b) by 0 days.

(21) Appl. No.: 13/983,385

(22) PCT Filed: Feb. 29, 2012

(86) PCT No.: PCT/US2012/027085
§ 371 (c)(1),
(2), (4) Date: Aug. 2, 2013

(87) PCT Pub. No.: WO2012/118882
PCT Pub. Date: Sep. 7, 2012

(65) Prior Publication Data
US 2013/0310505 A1  Nov. 21, 2013

Related U.S. Application Data

(60) Provisional application No. 61/447,870, filed on Mar. 1, 2011.

(51) Int. Cl.
*C08G 18/42* (2006.01)
*C08L 75/04* (2006.01)
*C08G 18/48* (2006.01)
*C08K 5/5317* (2006.01)

(52) U.S. Cl.
CPC .............. *C08L 75/04* (2013.01); *C08G 18/42* (2013.01); *C08G 18/48* (2013.01); *C08K 5/5317* (2013.01)

(58) Field of Classification Search
CPC .......... C08L 75/04; C08L 75/06; C08L 75/08; C08L 85/02; C08K 5/5333; C08G 79/04
USPC ......................................................... 525/452
See application file for complete search history.

(56) References Cited

U.S. PATENT DOCUMENTS

| | | | | |
|---|---|---|---|---|
| 2,983,712 A * | 5/1961 | Wilkinson | ...................... | 526/240 |
| 3,544,597 A * | 12/1970 | Killam | ............................. | 549/63 |
| 3,991,134 A | 11/1976 | Kraft et al. | | |
| 4,034,001 A * | 7/1977 | Miller et al. | .................... | 562/106 |
| 4,690,964 A * | 9/1987 | Schmidt et al. | ............... | 524/125 |
| 4,725,499 A * | 2/1988 | Itoh et al. | ....................... | 428/361 |
| 4,812,544 A * | 3/1989 | Sopko et al. | ..................... | 526/73 |
| 5,151,457 A * | 9/1992 | Ishida et al. | .................... | 524/157 |
| 5,574,104 A | 11/1996 | Kolycheck et al. | | |
| 5,837,760 A * | 11/1998 | Hackl et al. | .................... | 524/127 |
| 6,657,005 B1 * | 12/2003 | Nishihata et al. | .............. | 525/64 |
| 6,794,475 B1 * | 9/2004 | Bialke et al. | ................... | 526/320 |
| 2005/0222285 A1 * | 10/2005 | Massengill et al. | ............. | 521/82 |
| 2013/0202970 A1 * | 8/2013 | Lu et al. | ........................ | 429/246 |

FOREIGN PATENT DOCUMENTS

| | | |
|---|---|---|
| EP | 0078992 A1 | 5/1983 |
| EP | 0617079 A2 | 9/1994 |

* cited by examiner

*Primary Examiner* — Mike M Dollinger
(74) *Attorney, Agent, or Firm* — Eryn Ace Fuhrer; Teresan W. Gilbert

(57) ABSTRACT

The present invention relates to flame retardant thermoplastic polyurethane (TPU) compositions that are prepared by compounding certain TPU's and with a polyphosphonate homopolymer or copolymer, and more specifically TPU compositions that pass ASTM E84 Class 1 and UL94 V0 ratings. The invention also relates to compositions that further include an inherently dissipative polymer to provide a TPU composition that has flame retardant properties, electrostatic discharge performance, good clarity and/or transparency, or any combination thereof.

17 Claims, No Drawings

US 9,657,172 B2

FLAME RETARDANT THERMOPLASTIC POLYURETHANE COMPOSITIONS

CROSS REFERENCE TO RELATED APPLICATION

This application claims priority from PCT Application Serial No. PCT/US2012/027085 filed on Feb. 29, 2012, which claims the benefit of U.S. Provisional Application No. 61/447,870 filed on Mar. 1, 2011.

FIELD OF THE INVENTION

The invention relates to flame retardant thermoplastic polyurethanes (TPU) that are prepared by blending certain TPU's and with a polyphosphonate polymer, for example, a homopolymer or copolymer. More specifically, the invention relates to TPU compositions that pass ASTM E84 Class I and UL94 V0 ratings. The invention also relates to compositions that further include an inherently dissipative polymer to provide a TPU composition that has flame retardant properties, electrostatic discharge performance, good clarity and/or transparency, or any combination thereof.

BACKGROUND OF THE INVENTION

The invention relates to TPU compositions with good flame retardancy as well as such TPU compositions that also include electrostatic dissipative polymers, an in addition good clarity and/or transparency.

It is generally very challenging to improve the flame retardancy of TPU compositions. This is because TPU materials typically de-polymerize into more flammable lower molecular weight monomers when exposed to high heat levels, which leads to dripping and smoke generation. Effective non-halogenated flame retardants are especially limited. While a liquid flame retardant additive can be added to a TPU composition, they generally cause dramatic increases in the smoke density seen from the composition when exposed to fire-like conditions. When traditional solid flame retardants are used, the clarity of the resulting TPU composition, which is required for some applications, is often harmed and even completely lost.

There is a desire for a TPU composition with improved flame retardancy, and specifically improved performance in the ASTM E84 Class I and UL94 V0 ratings procedures. It is most desirable to achieve these improved results without the use of a halogenated flame retardant additive, or any flame retardant additive at all. There is also a desire for such TPU compositions that are also translucent and/or transparent. There is also a desire for such TPU compositions that are also inherently dissipative with regards to electrostatic charges. Combining materials with good flame retardancy with materials with good electrostatic properties results in a blend that has diminished effectiveness in one or both of these areas. It is very difficult to maintain the desired properties of the materials and end up with a final composition that has good performance in both areas. Clarity and transparency adds yet another difficulty and combining materials, even when each is clear on their own, often results in a blend that has reduced clarity. There is a need for compositions that balance all of these properties resulting in materials with good flame retardancy, good electrostatic properties, and good clarity.

SUMMARY OF THE INVENTION

The invention provides a composition that includes a blend of (i) a thermoplastic polyurethane component; (ii) a polyphosphonate polymer component; and optionally one or more additional performance additives. The polyphosphonate polymer component may include a homopolymer of a phosphonate, a copolymer of two or more phosphonates, or a combination thereof, and may also be a polyalkylphosphonate polymer. The thermoplastic polyurethane component may be made by reacting (a) at least one polyol intermediate with (b) at least one diisocyanate and (c) at least one chain extender.

The invention further provides a composition that includes a blend of (i) a thermoplastic polyurethane component; (ii) a polyphosphonate polymer component; and (iii) an inherently dissipative polymer component, and may optionally include one or more additional performance additives.

The compositions of the invention may also include a compatibilizer, as an additional blend component, often in the form of a flame retardant additive that works with the polyphosphonate polymer component to improve the overall performance of the composition. This additional component may be a brominated organic compound, such as a brominated diol.

The invention further provides compositions, as described above, where the composition: (i) meets a Class II or better rating as measured according to ASTM E84; (ii) meets a V1 or better rating as measured according to UL94; (iii) has a haze of lower than 50% as measured according to ASTM D-1003; (iv) has a surface resistivity of between 1E6 and 1E12 ohms/sq as measured at 50% relative humidity according to ASTM D-257; or (v) any combination thereof.

The invention further provides a method of producing a composition that includes a blend of: (i) a thermoplastic polyurethane component; and (ii) a polyphosphonate component; wherein the method includes the steps of mixing components (i) and (ii) in an internal mixing device, such as a twin screw extruder.

The invention further provides a shaped polymeric article made from one of the thermoplastic polyurethane compositions described herein. These articles may be prepared by traditional polymer processing methods comprising: injection molding, sheet extrusion, profile extrusion, blown film extrusion, melt lamination, compression molding, or any combination thereof.

DETAILED DESCRIPTION OF THE INVENTION

Various features and embodiments of the invention will be described below by way of non-limiting illustration.

The Blend Compositions

The compositions of the invention are blends of: (i) a thermoplastic polyurethane component (TPU); and (ii) a polyphosphonate polymer component. The compositions of the invention may also be described as flame retardant thermoplastic polyurethane compositions. The blends may also contain one or more additional performance additives. In other embodiments, the blend compositions may further comprise (iii) an inherently dissipative polymer (IDP) component, which may also be called an electrostatic dissipative TPU (ESD-TPU). In some embodiments, these blends: (i) meet a Class 2 or better, or Class 1 rating as measured according to ASTM E84; (ii) meet a V1 or better, or a V0 rating as measured according to UL94; (iii) has a haze of lower than 50% or even 30% as measured according to ASTM D-1003; (iv) has a surface resistivity of between 1E6 or 1E7 up to 1E13 ohms/sq as measured at 50% relative humidity according to ASTM D-257; or (v) any combination thereof.

The proportions of the blend compositions of the invention are not overly limited. In some embodiments, the TPU is present at 20-80 weight percent of the overall composition. In other embodiments, the TPU is present from 30 to 70, 40 to 60, or even 50 percent by weight of the overall composition.

The polyphosphonate component may be present in the overall composition from 80 to 20, 70 to 30, 60 to 40 or even 50 percent by weight.

The inherently dissipative polymer, when present, may be present in the overall composition from 80 to 20, 70 to 30, 60 to 40 or even 50 percent by weight. In other embodiments, the inherently dissipative polymer takes the place of 10 to 70, 20 to 60, or 30 to 50 percent of the TPU component, where the ranges provided above for the TPU then represent the combined total of the TPU and the inherently dissipative polymer in the overall composition. In some embodiments, the composition of the invention contains at least 40 percent by weight inherently dissipative polymer, up to any of the upper limits mentioned above.

The optional additional additives, when present, my be present in the overall composition from 0 to 20, 0.1 to 20, 0.5 to 10, 1 to 10 or even 1 to 5 percent by weight. These ranges may be applied to the combined total of all additional additives present or to each additional additive separately.

The Thermoplastic Polyurethane

The compositions of the invention include a thermoplastic polyurethane, generally an elastomeric (i.e., non-rigid) polyurethane. The thermoplastic polyurethane (TPU) component may be made by reacting (a) at least one polyol intermediate with (b) at least one diisocyanate and (c) at least one chain extender. In some embodiments, the TPU is an aromatic TPU, that is, it is derived from an aromatic diisocyanate. In other embodiments, the TPU is transparent. As used herein, transparent is defined as have a light transmission through a 40 mil sheet of at least 30%, at least 50%, at least 60%, 70%, 80%, and even at least 83% or 85%, as measured by ASTM D-1003. In some embodiments, the TPU is a polyether TPU. In other embodiments, the TPU is a polyester TPU. Haze and light transmission data indicate how transparent the examples are at a specified thickness. These properties may be evaluated using ASTM D-1003. Haze gives an indication of how transparent the sample is while light transmission gives an indication of translucence.

The three reactants (the polyol intermediate, the diisocyanate, and the chain extender) may be reacted together to form the TPU useful in this invention. Any known processes to react the three reactants may be used to make the TPU. In one embodiment, the process is a so-called "one-shot" process where all three reactants are added to an extruder reactor and reacted. The equivalent weight amount of the diisocyanate to the total equivalent weight amount of the hydroxyl containing components, that is, the polyol intermediate and the chain extender glycol, can be from about 0.95 to about 1.10, or from about 0.96 to about 1.02, and even from about 0.97 to about 1.005. Reaction temperatures utilizing a urethane catalyst can be from about 175 degrees C. to about 245 degrees C., and in other embodiment from 180 degrees C. to 220 degrees C.

Generally, any conventional catalyst can be utilized to react the diisocyanate with the polyol intermediates or the chain extender. Examples of suitable catalysts include the various alkyl amines, alkyl ethers or alkyl thiol ethers of bismuth or tin wherein the alkyl portion has from 1 to about 20 carbon atoms with specific examples including bismuth octoate, bismuth laurate, and the like. Preferred catalysts include the various tin catalysts such as stannous octoate, dibutyltin dioctoate, dibutyltin dilaurate, and the like. The amount of such catalyst is generally small, such as from about 20 to about 200 parts per million based upon the total weight of the polyurethane forming reactants.

The TPU can also be prepared utilizing a pre-polymer process. In the pre-polymer route, the polyol intermediates are reacted with generally an equivalent excess of one or more diisocyanates to form a pre-polymer solution having free or unreacted diisocyanate therein. The reaction is generally carried out at temperatures of from about 80 degrees C. to about 220 degrees C., or from about 150 degrees C. to about 200 degrees C. in the presence of a suitable urethane catalyst. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about 0.95 to about 1.10, or from about 0.96 to about 1.02 and even from about 0.97 to about 1.05. The chain extension reaction temperature is generally from about 180 degrees C. to about 250 degrees C. or from about 200 degrees C. to about 240 degrees C. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25.

In one embodiment, the ingredients are mixed on a single or twin screw extruder with multiple heat zones and multiple feed ports between its feed end and its die end. The ingredients may be added at one or more of the feed ports and the resulting TPU composition that exits the die end of the extruder may be pelletized.

In some embodiments, the polyol intermediate includes poly(diethylene glycol adipate), the diisocyanate includes 4,4'-methylenebis-(phenyl isocyanate), and the chain extender includes butanediol, HQEE (hydroquinone bis(2-hydroxyethyl)ether), or combinations thereof.

In some embodiments, the thermoplastic polyurethane component, has a hardness of no more than 70D, as measured by ASTM D2240, and may in other embodiments have a hardness of no more than 60D, and in other embodiments may have a hardness of 70A to 55D.

The thermoplastic polyurethane may be present at 20-80 weight percent of the overall composition, may be polyester thermoplastic polyurethane, as described above, may have a hardness of 40D to 55D, or may include any combination of these features.

The Polyphosphonate

The polyphosphonate polymer component may include a homopolymer of a phosphonate, a copolymer of two or more phosphonates, or a combination thereof. Phosphonates, or phosphonic acids are organic compounds that may be represented by the structure: $R^1—P(=O)(—OR^2)(—OR^3)$ wherein each $R^1$, $R^2$, and $R^3$ is independently a hydrocarbyl group or hydrogen, typically containing from 1 to 10 carbon atoms.

These polyphosphonate polymers are distinct from phosphine oxide-based materials (for example, those described in U.S. Pat. No. 7,893,143) and in some embodiments, the compositions of the invention are substantially free of, or even free of, phosphine oxide-based materials. The polyphosphonate polymers of the present invention each contain multiple phosphorus atoms, as the phosphonate is the repeating unit of the polymer. In contrast, phosphine oxide-based materials generally have a single phosphorus atom.

Examples of phosphonates, which may be used to prepare suitable polyphosphonates, include: 2-aminoethylphosphonic acid, dimethyl methylphosphonate, 1-hydroxy ethylidene-1,1-diphosphonic acid, amino tris(methylene phosphonic acid), ethylenediamine tetra(methylene phosphonic acid), tetramethylenediamine tetra(methylene phosphonic acid), hexamethylenediamine tetra(methylene phosphonic acid), diethylenetriamine penta(methylene phosphonic acid), phosphonobutane-tricarboxylic acid, N-(phosphonomethyl)iminodiacetic acid, 2-carboxyethyl phosphonic acid, 2-hydroxyphosphonocarboxylic acid, and amino-tris-(methylene-phosphonic acid).

In some embodiments, the polyphosphonate component of the invention may include a polyphosphonate homopolymer, a polyphosphonate-polycarbonate block copolymer; or a combination thereof. Suitable materials are available commercially from FRX™ Polymers, Inc.

In some embodiments, the polyphosphonate polymer component is a polyalkylphosphonate, and is free of polyarylphosphonates, or at least substantially free of polyarylphosphonates.

The Inherently Dissipative Polymer

The compositions of the invention may include an inherently dissipative polymer. That is a polymer that has electrostatic dissipative (ESD) properties. In some embodiments, the polymer comprises a thermoplastic elastomer. Such materials may be generally described as polymers having in their backbone structures hard and/or crystalline segments and/or blocks in combination with soft and/or rubbery segments and/or blocks.

In some embodiments, the inherently dissipative polymer includes a thermoplastic polyurethane (TPU), a polyolefin polyether copolymer, a thermoplastic polyester elastomer (COPE), a polyether block amide elastomer (COPA or PEBA), or a combination thereof.

Polymers suitable for use in the compositions of the invention may also be described as polymers derived from low molecular weight polyether oligomers, wherein the polymers display relatively low surface and volume resistivities, yet generally are free of excessive levels of extractable anions.

The low molecular weight polyether oligomer useful in the invention can comprise a homopolymer of ethylene oxide having a number average molecular weight of from about 500 to about 5000. The low molecular weight polyether oligomer can also comprise a copolymer of two or more co-polymerizable monomers wherein one of the monomers is ethylene oxide and has a number average molecular weight from about 200 to about 20,000.

Exemplary of the co-monomers which can be copolymerized with ethylene oxide are: 1,2-epoxypropane(propylene oxide); 1,2-epoxybutane; 2,3-epoxybutane(cis & trans); 1,2-epoxypentane; 2,3-epoxypentane(cis & trans); 1,2-epoxyhextane; 2,3-epoxyhexane(cis & trans); 3,4-epoxyhexane (cis & trans); 1,2-epoxy heptane; 1,2-epoxydecane; 1,2-epoxydodecane; 1,2-epoxyoctadecane; 7-ethyl-2-methyl-1,2-epoxyundecane; 2,6,8-trimethyl-1,2-epoxynonane; styrene oxide.

Other co-monomers which can be used as co-monomers with the ethylene oxide are: cyclohexene oxide; 6-oxabicyclo[3,1,0]-hexane; 7-oxabicyclo[4,1,0]heptane; 3-chloro-1,2-epoxybutane; 3-chloro-2,3-epxybutane; 3,3-dichloro-1,2-epoxypropane; 3,3,3-trichloro-1,2-epoxypropane; 3-bromo-1-2-epoxybutane, 3-fluoro-1,2-epoxybutane; 3-iodo-1,2-epoxybutane; 1,1-dichloro-1-fluoro-2,3-epoxypropane; 1-chloro-1,1-dichloro-2,3-epoxypropane; and 1,1,1,2-pentachloro-3,4-epoxybutane.

Typical co-monomers with at least one ether linkage useful as co-monomers are exemplified by: ethyl glycidyl ether; n-butyl glycidyl ether; isobutyl glycidyl ether; t-butyl glycidyl ether; n-hexyl glycidyl ether; 2-ethylhexyl glycidyl ether; heptafluoroisopropyl glycidyl ether, phenyl glycidyl ether; 4-methyl phenyl glycidyl ether; benzyl glycidyl ether; 2-phenylethyl glycidyl ether; 1,2-dihydropentafluoroisopropyl glycidyl ether; 1,2-trihydrotetrafluoroisopropyl glycidyl ether; 1,1-dihydrotetrafluoropropyl glycidyl ether; 1,1-dihydranonafluoropentyl glycidyl ether; 1,1-dihydropentadecafluorooctyl glycidyl ether; 1,1-dihydropentadecafluorooctyl-alpha-methyl glycidyl ether; 1,1-dihydropentadecafluorooctyl-beta-methyl glycidyl ether; 1,1-dihydropentadecafluorooctyl-alpha-ethyl glycidyl ether; 2,2,2-trifluoro ethyl glycidyl ether.

Other co-monomers with at least one ester linkage which are useful as co-monomers to copolymerize with ethylene oxide are: glycidyl acetate; glycidyl chloroacetate; glycidyl butyrate; and glycidyl stearate; to name a few.

Typical unsaturated co-monomers which can be polymerized with ethylene oxide are: allyl glycidyl ether; 4-vinylcyclohexyl glycidyl ether; alpha-terpinyl glycidyl ether; cyclohexenylmethyl glycidyl ether; p-vinylbenzyl glycidyl ether; allylphenyl glycidyl ether; vinyl glycidyl ether; 3,4-epoxy-1-pentene; 4,5-epoxy-2-pentene; 1,2-epoxy-5,9-cyclododecadiene; 3,4-epoxy-1-vinylchlohexene; 1,2-epoxy-5-cyclooctene; glycidyl acrylate; glycidyl methacrylate; glycidyl crotonate; glycidyl 4-hexenoate.

Other cyclic monomers suitable to copolymerize with ethylene oxide are cyclic ethers with four or more member-ring containing up to 25 carbon atoms except tetrahydropyran and its derivatives. Exemplary cyclic ethers with four or more member-ring are oxetane (1,3-epoxide), tetrahydrofuran (1,5-epoxide), and oxepane (1,6-epoxide) and their derivatives.

Other suitable cyclic monomers are cyclic acetals containing up to 25 carbon atoms. Exemplary cyclic acetals are trioxane, dioxolane, 1,3,6,9-tetraoxacycloundecane, trioxepane, troxocane, dioxepane and their derivatives.

Other suitable cyclic monomers are cyclic esters containing up to 25 carbon atoms. Exemplary cyclic esters are beta-valerolactone, epsilon-caprolactone, zeta-enantholactone, eta-caprylactone, butyrolactone and their derivatives. The low molecular weight polyether oligomer prepared by the method detailed immediately above then can be reacted with a variety of chain extenders and modified with a selected salt to form the electrostatic dissipative polymer additive or antistatic agent of the invention.

A preferred embodiment of the polyester-ether block copolymer comprises the reaction product of ethylene glycol, terephthalic acid or dimethyl terephthalate and polyethylene glycol. These and other examples of other polyester-ether copolymers which can be utilized are set forth in the Encyclopedia of Polymer Science and Engineering, Vol. 12, John Wiley & Sons, Inc., NY, N.Y., 1988, pages 49-52, which is hereby fully incorporated by reference as well as U.S. Pat. Nos. 2,623,031; 3,651,014; 3,763,109; and 3,896,078.

Alternatively, the low molecular weight polyether oligomer can be reacted to form an electrostatic dissipative agent comprising one or more polyamide blocks as well as one or more low molecular weight polyether oligomer blocks. Alternatively, the low molecular weight polyether oligomer may be reacted with the polyamide in the presence of a di-acid to form a polyether ester amide. Further information on this type of polymer can be found in U.S. Pat. No. 4,332,920.

In some embodiments, the inherently dissipative thermoplastic polyurethane is made by reacting at least one polyol intermediate with at least one diisocyanate and at least one chain extender. The polyol intermediate may be a polyalkylene glycol and/or a poly(dialkylene glycol ester). Suitable polyalkylene glycols include polyethylene glycol, polypropylene glycol, polyethyleneglycol-polypropylene glycol copolymers, and combinations thereof. Suitable poly(dialkylene glycol ester)polyol intermediates may be derived from at least one dialkylene glycol and at least one dicarboxylic acid, or an ester or anhydride thereof. The polyol intermediate may also be a mixture of two or more different types of polyols. In some embodiments, the polyol intermediate includes a polyester polyol and a polyether polyol.

Referring first to the polyester intermediate, a hydroxyl terminated, saturated polyester polymer is synthesized by reacting excess equivalents of diethylene glycol with considerably lesser equivalents of an aliphatic, preferably an alkylene, dicarboxylic acid having four to ten carbon atoms where the most preferred is adipic acid.

The hydroxyl terminated polyester oligomer intermediate is further reacted with considerably excess equivalents of non-hindered diisocyanate along with extender glycol in a so-called one-shot or simultaneous co-reaction of oligomer, diisocyanate, and extender glycol to produce the very high molecular weight linear polyurethane having an average molecular weight broadly from about 60,000 to about 500,000, preferably from about 80,000 to about 180,000, and most preferably from about 100,000 to about 180,000.

Alternatively, an ethylene ether oligomer glycol intermediate comprising a polyethylene glycol can be co-reacted with non-hindered diisocyanate and extender glycol to produce the high molecular weight, polyurethane polymer. Useful polyethylene glycols are linear polymers of the general formula $H-(OCH_2\ CH_2)_n-OH$ where n is the number of repeating ethylene ether units and n is at least 11 and between 11 and about 115. On a molecular weight basis, the useful range of polyethylene glycols have an average molecular weight from about 500 to about 5000 and preferably from about 700 to about 2500. Commercially available polyethylene glycols useful in this invention are typically designated as polyethylene glycol 600, polyethylene glycol 1500, and polyethylene glycol 4000.

In accordance with this invention, high molecular weight thermoplastic polyurethanes are produced by reacting together preferably in a one-shot process the ethylene ether oligomer glycol intermediate, an aromatic or aliphatic non-hindered diisocyanate, and an extender glycol. On a mole basis, the amount of extender glycol for each mole of oligomer glycol intermediate is from about 0.1 to about 3.0 moles, desirably from about 0.2 to about 2.1 moles, and preferably from about 0.5 to about 1.5 moles. On a mole basis, the high molecular weight polyurethane polymer comprises from about 0.97 to about 1.02 moles, and preferably about 1.0 moles of non-hindered diisocyanate for every 1.0 total moles of both the extender glycol and the oligomer glycol (i.e., extender glycol+oligomer glycol–1.0).

Useful non-hindered diisocyanates comprise aromatic non-hindered diisocyanates and include, for example, 1,4-diisocyanatobenzene (PPDI), 4,4'-methylene-bis(phenyl isocyanate) MDI), 1,5-naphthalene diisocyanate (NDI), m-xylene diisocyanate (XDI), as well as non-hindered, cyclic aliphatic diisocyanates such as 1,4-cyclohexyl diisocyanate (CHDI), and $H_{12}$ MDI. The most preferred diisocyanate is MDI. Suitable extender glycols (i.e., chain extenders) are aliphatic short chain glycols having two to six carbon atoms and containing only primary alcohol groups. Preferred glycols include diethylene glycol, 1,3-propane diol, 1,4-butane diol, 1,5-pentane diol, 1,4-cyclohexane-dimethanol, hydroquinone di(hydroxyethyl)ether, and 1,6-hexane diol with the most preferred glycol being 1,4-butane diol.

In accordance with the invention, the hydroxyl terminated ethylene ether oligomer intermediate, the non-hindered diisocyanate, and the aliphatic extender glycol are co-reacted simultaneously in a one-shot polymerization process at a temperature above about 100° C. and usually about 120° C., whereupon the reaction is exothermic and the reaction temperature is increased to about 200° C. to above 250° C.

In embodiments where the inherently dissipative polymer (IDP) is present, the compositions include: (i) a thermoplastic polyurethane component; (ii) a polyphosphonate component; (iii) an inherently dissipative polymer component; and optionally one or more additional performance additives.

In some embodiments, the IDP is: (a) a chain extended low molecular weight polyoxirane; (b) a chain extended low molecular weight polyester polyol derived from at least one dialkylene glycol and at least one dicarboxylic acid, ester, or anhydride; or (c) a combination thereof.

The chain extended low molecular weight polyoxirane may be a chain extended polyether oligomer, wherein the polyether oligomer includes a homopolymer or copolymer of polyethylene glycol (PEG), polypropylene glycol (PPG), or combination thereof. In other words, the IDP contains PEG and/or PPG segments. The homopolymer or copolymer of PEG may be a homopolymer of ethylene glycol having a weight average molecular weight of about 500 to about 2500 or a copolymer of ethylene glycol and at least one other glycol where the copolymer has a weight average molecular weight of about 500 to about 5000.

The chain extended low molecular weight polyoxirane may also comprise: a polyether amide block copolymer, a polyether-ester block copolymer, a polyolefin polyether copolymer, or a combination thereof. The dialkylene glycol may include: oxydimethanol, diethylene glycol, dipropylene glycol, 3,3-oxydipropan-1-ol, dibutylene glycol, or combinations thereof.

The Additional Performance Additives

The compositions of the invention may further include additional useful additives, either as separate components or mixed into one or more of the components described above, where such additives can be utilized in suitable amounts. These optional additional additives include fillers, reinforcing fillers, pigments, heat stabilizers, UV stabilizers, flame retardants, plasticizers, rheology modifiers, processing aids, lubricants, mold release agents, and combinations thereof. Useful pigments include opacifying pigments such as titanium dioxide, zinc oxide, and titanate yellow. Useful pigments also include tinting pigments such as carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV stabilizers include 2-(2'-hydroxyphenol)benzotriazoles and 2-hydroxybenzophenones. Additives can also be used to improve the hydrolytic stability of the TPU polymer. Each of these optional additional additives described above may be present in, or excluded from, the compositions described herein.

In some embodiments, the optional additional additives include waxes, release agents, antioxidants, reinforcing fillers, pigments, flame retardants in addition to the polyphosphonate polymer component, or combinations thereof. Suitable reinforcing fillers include mineral fillers and glass fibers.

In some embodiments, the compositions of the invention are substantially free to free of fluorine atoms, chlorine atoms, bromine atoms, iodine atoms, astatine atoms, or combinations thereof (including ions of said atoms). In some embodiments, the compositions of the invention are substantially free to free of salts and/or other compounds containing fluorine, chlorine, bromine, iodine, and/or astatine atoms, and/or ions of one or more thereof. In some embodiments, the compositions of the invention are substantially free to free of all halogens atoms, halogen-containing salts, and/or other halogen-containing compounds. Here, by substantially free, it is meant that the compositions contain less than 10,000 parts per million or even 10,000 parts per billion of fluorine/fluoride, chorine/chloride, bromine/bromide, iodine/iodide, astatine/astatide, or combinations of the atoms/ions thereof.

In some embodiments, the additional performances additive that may be present, either in the overall composition, or in one or more components of the composition, includes waxes, process aids, antioxidants, heat stabilizers, UV stabilizers, hydrolysis stabilizers, colorants, flame retardants in addition to the polyphosphonate polymer component, ionic additives, or any combination thereof. Suitable examples of the ionic additive include a metal containing salt, an ionic liquid, or a combination thereof.

In some embodiments, the compositions further include a secondary flame retardant additive, in addition to the polyphosphonate polymer described above. This additional flame retardant can act as a synergist or promoter, improving the performance of the overall composition in one or more of the areas described above, and in particular may improve the overall flame retardancy of the composition. In some embodiments, this additional flame retardant is a brominated organic compound, for example, a brominated diol. It may contain from 5 to 20 carbon atoms, and in some embodiments 5 to 10, or even 5 carbon atoms, and may contain a quaternary carbon atom. In addition to the ranges described above, this additional additive may be present in an amount sufficient to provide the desired flame retardancy, and in other embodiments may be present from 0 to 15 percent by weight of the overall composition, or even from 0 to 10, from 0.1 to 7, or from 0.2 to 5 percent by weight of the overall composition.

In some embodiments, the secondary flame retardant additive, which may act as a synergist or promoter, may include brominated organic compounds. Suitable examples include brominated diols, brominated mono-alcohols, brominated ethers, brominated esters, brominated phosphates, and combinations thereof. Suitable borminated organic compounds may include tetrabromobisphenol-A, hexabromocyclododecane, poly(pentabromobenzyl acrylate), pentabromobenzyl acrylate, tetrabromobisphenol A-bis(2,3-dibromopropyl ether), tribromophenol, dibromoneopentyl glycol, tribromoneopentyl alcohol, tris(tribromoneopentyl) phosphate, and 4,4'-isopropylidenebis[2-(2,6-dibromophenoxy)ethanol].

In some embodiments, the secondary flame retardant additive includes a metal salt of a halogen borate, metal salt of halogen phosphate, or a combination thereof. In some embodiments the secondary flame retardant additive includes a metal salt of organic sulphonate, for example, a sodium salt of a alkyl benzene sulfonate. In some embodiments, the secondary flame retardant additive includes a nitrogen-containing compound. These secondary flame retardant additives may be present as a separate component added to the composition, or they may be present as an additional additive in one of the components described above, particularly the inherently dissipative polymer, which is used to prepare the compositions of the invention.

In still further embodiments, the compositions of the invention include a halogen-free metal salt of an amidoalkanesulfonic acid, a hydrocarbyl-substituted benzene sulfonic acid, or a mixture thereof. The salts may also be a salt of a polymer derived from a halogen-free metal salt of an amidoalkanesulfonic acid, a hydrocarbyl-substituted benzene sulfonic acid, or a mixture thereof. In some embodiments, the salt is mixed in the inherently dissipative polymer, which is then combined with the other components described above to prepare the compositions of the invention.

In some embodiments, the salt is a halogen-free metal salt of an amidoalkanesulfonic acid or polymer derived from said acid where said acid is represented by the formula:

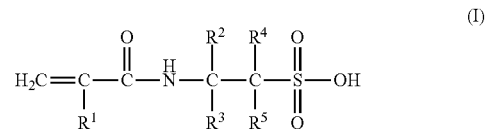

wherein $R^1$ is hydrogen or a hydrocarbyl group; and each $R^2$, $R^3$, $R^4$ and $R^5$ is independently hydrogen, a hydrocarbyl group, or —$CH_2SO_3H$. In some embodiments, $R^1$ contains from 1 to 7 carbon atoms or from 1 to 6, 1 to 3 or is an mixture of hydrogen and hydrocarbyl groups containing from 1 to 3 carbon atoms. In some embodiments, $R^1$ is hydrogen. In some embodiments, each $R^2$, $R^3$, $R^4$ and $R^5$ is independently hydrogen or a hydrocarbyl group containing from 1 to 16 or from 1 to 7 carbon atoms or even from 1 to 6, 3 or even 2 carbon atoms.

One suitable example of these materials is 2-acrylamido-2-methylpropane sulfonic acid (The commercial grade material is believed to include a byproduct fraction containing two sulfonic acid groups as described above. This and related materials are similarly considered to be a part of the invention). This material is commercially available from The Lubrizol Corporation as AMPS® monomer. Other useful materials of this type include 2-acrylamidoethanesulfonic acid, 2-acrylamidopropanesulfonic acid, 2-methacrylamidopropanesulfonic acid, and 2-methacrylamido-2-methylpropanesulfonic acid. Such materials and methods for their preparation are disclosed, for instance, in U.S. Pat. No. 3,544,597 and U.S. Pat. No. 6,448,347.

In some embodiments, the salt is a halogen-free metal salt of a hydrocarbyl-substituted benzene sulfonic acid or polymer derived from said acid where said acid is represented by the formula:

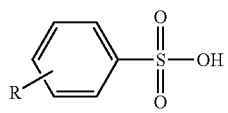

where R is a hydrocarbyl group containing from 2 to 24 or even 2 to 20 carbon atoms. In some embodiments, R contains from 2 to 15 or 11 to 15 carbon atoms. In some embodiments, the acid of formula (II) may contain one or more additional substituent groups, where the additional substituent group may be located anywhere on the aromatic ring, just as the R group above is shown, and may contain 1 to 2 carbon atoms.

Suitable examples include alkenyl and/or alkyl substituted benzene sulfonic acids or polymer derived thereof. In some embodiments, the salt is derived from an alkenyl substituted benzene sulfonic acid such as styrene sulfonic acid and/or sulfonates. In some embodiments, the salt is derived from an alkyl substituted benzene sulfonic acid such as lineal alkyl benzene sulfonic acids and/or sulfonates.

The salts of the invention may be formed by salting the acids described above with an alkali and/or alkaline earth metal. In some embodiments, the acids are salted with lithium, sodium, potassium, magnesium, calcium, or combinations thereof. In some embodiments, the salts of the invention are sodium or lithium salts, and in other embodiments lithium salts.

As noted above, the salts of the invention may be salts of polymers derived from one or more of the acids described above. These polymers may be homopolymers, copolymers or even terpolymers. Well-known methods and materials, such as acrylic acid and similar materials described in the sections above, may be used in the polymerizations of the acids described herein.

In some embodiments, the salts of the invention include: a sodium salt of an amidoalkanesulfonic acid represented by the formula (I) above; a lithium salt of an amidoalkanesulfonic acid represented by the formula (I) above; a lithium salt of styrene sulfonic acid; a copolymer of a lithium salt of styrene sulfonic acid and acrylic acid; a copolymer of a lithium salt of an amidoalkanesulfonic acid represented by the formula (I) above and acrylic acid; a terpolymer of a lithium salt of an amidoalkanesulfonic acid represented by the formula (I) above, a lithium salt of styrene sulfonic acid, and acrylic acid; or combinations thereof. In additional embodiments, sodium equivalents of any of the lithium examples described above may also be prepared.

While the exact mechanism of attachment and/or attraction of the salt to the polymer reaction product is not completely understood, the salt can unexpectedly improve the surface and volume resistivities of the resulting polymer as well as that of any composition into which the polymer is blended, and may accomplish this without the presence of unacceptably high levels of extractable anions. Moreover, the static decay times may remain in an acceptable range, that is, the times are not too fast or too slow. Further, the salt may also work to improve the flame retardancy of the polymer, as well as any composition in which the polymer is blended. In addition, in some embodiments, it is noted that the salt enhances one or more of these benefits while not impacting the clarity and/or transparency of the overall composition in which the salt is used and/or in which the inherently dissipative polymer which contains the salt is used.

The compositions of the invention, and in some embodiments, the inherently dissipative polymers described above, may also contain one or more other salts that are effective as an ESD additive, in place of or in combination with the salts described above. In some embodiments, these additional salts include metal-containing salts that contain a metal other than lithium. These salts may also include halogen-containing salts. Such salts include metal-containing salts, salt complexes, or salt compounds formed by the union of metal ion with a non-metallic ion or molecule. The amount of salt present may be an amount effective to provide improved ESD properties to the inherently dissipative polymers and/or the overall composition. Any of these salt components may be added during the one-shot polymerization process used to prepare the inherently dissipative polymer.

Suitable salts that may be used in combination with those described above include halogen-free lithium-containing salt such as those represented by the formula:

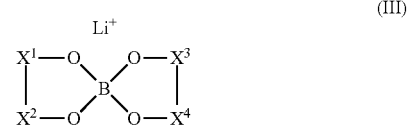

wherein each $-X^1-$, $-X^2-$, $-X^3-$ and $-X^4-$ is independently $-C(O)-$, $-C(R^1R^2)-$, $-C(O)-C(R^1R^2)-$ or $-C(R^1R^2)-C(R^1R^2)-$ where each $R^1$ and $R^2$ is independently hydrogen or a hydrocarbyl group and wherein the $R^1$ and $R^2$ of a given X group may be linked to form a ring. In some embodiments, the salt is represent by Formula III wherein $-X^1-$, $-X^2$, $-X^3-$ and $-X^4-$ are $-C(O)-$.

Suitable salts also include the open, -ate structures of such salts, including Lithium bis(oxalate)borate.

In some embodiments, the halogen-free lithium-containing salt comprises lithium bis(oxalato)borate, lithium bis(glycolato)borate, lithium bis(lactato)borate, lithium bis(malonato)borate, lithium bis(salicylate)borate, lithium (glycolato,oxalato) borate, or combinations thereof.

Additional examples of salts that may be used in place of or in combination with those described above: Li—ClO$_4$, Li—N(CF$_3$ SO$_2$)$_2$, Li—PF$_6$, Li—AsF$_6$, Li—I, Li—Cl, Li—Br, Li—SCN, Li—SO$_3$CF$_3$, Li—NO$_3$, Li—C(SO$_2$CF$_3$)$_3$, Li$_2$S, Li—OSO$_2$CF$_3$ and Li-MR$_4$, where M is Al or B, and R is a halogen, hydrocarbyl, alkyl or aryl group. In one embodiment, the salt is Li—N(CF$_3$ SO$_2$)$_2$, which is commonly referred to as lithium trifluoromethane sulfonamide, or the lithium salt of trifluoromethane sulfonic acid.

For any of these salts, the effective amount of the selected salt added to the one-shot polymerization may be at least about 0.10, 0.25, or even 0.75 parts by weight based on 100 parts by weight of the polymer.

The compositions of the invention may also include a non-metal containing anti-stat additives, such as ionic liquids. Suitable liquids include tri-n-butylmethylammonium bis-(trifluoroethanesulfonyl)imide (available as FC-4400 from 3M™), one or more the Basionics™ line of ionic liquids (available from BASF™), and similar materials.

In some embodiments, the invention allows for the use of solvent with the metal containing salt. The use of a solvent, may in some embodiments, allow a lower charge of salt to provide the same benefit in ESD properties. Suitable solvents include ethylene carbonate, propylene carbonate, dimethyl sulfoxide, tetramethylene sulfone, tri- and tetra ethylene glycol dimethyl ether, gamma butyrolactone, and N-methyl-2-pyrrolidone. When present, the solvent may be used at least about 0.10, 0.50 or even 1.0 parts by weight based on 100 parts by weight of the polymer. In some embodiments, the compositions of the invention are substantially free of to free of any or all of the solvents described herein.

In other embodiments, the compositions of the invention are substantially free of to free of any or all of the metal containing salts and/or substantially free of to free of any ESD additives except for the a halogen-free metal salts of an amidoalkanesulfonic acid, a hydrocarbyl-substituted benzene sulfonic acid, or a mixture thereof, or a polymer derived from a halogen-free metal salt of an amidoalkanesulfonic acid, a hydrocarbyl-substituted benzene sulfonic acid, or a mixture thereof, described above.

The effective amount of the selected salt in the inherently dissipative polymer, or evening the overall composition, may be at least about 0.10 parts based on 100 parts of the polymer, and in some embodiments, at least about 0.25 parts or even at least about 0.75 parts. In some embodiments, these amounts are with respect to each individual salt present in the composition. In other embodiments, the amounts apply to the total amount of all salts present in the composition.

INDUSTRIAL APPLICATION

The compositions of the invention are useful for forming any article that could benefit from the properties of conventional TPU but which also needs good flame retardancy, either alone or in combination with good electrostatic dissipative properties, transparency, or a combination thereof.

Such articles are not overly limited and include a wide range of uses and applications, for example, constructions materials. The invention is of particular value in applications that have high flame resistance requirements, including many building supplies such as pipes and similar materials.

When the optional IDP component is present, the compositions may be used in the preparation of polymeric articles, especially where ESD properties are of a concern. Examples of applications in which the compositions described above may be used building and construction materials and equipment, machine housings, manufacturing equipment, and polymeric sheets and films. More specifically, examples include: fuel handling equipment such as fuel lines and vapor return equipment; business equipment; coatings for floors such as for clean rooms and construction areas; clean room equipment such as floorings, and mats; medical applications; battery parts such as dividers and/or separators, etc. The compositions of the invention may be used in any articles that require some level of ESD properties.

In one embodiment, the compositions of the invention are used to make polymeric articles to be used as: internal battery separators for use in the construction of lithium-ion batteries; clean room supplies and construction materials; antistatic conveyor belts; fibers; parts for office machines; antistatic garments and shoes, or combinations thereof.

The compositions can be used with various melt processing techniques including injection molding, compression molding, slush molding, extrusion, thermoforming cast, rotational molding, sintering, and vacuum molding. Articles of this invention may also be made from resins produced by the suspension, mass, emulsion or solution processes.

In some embodiments, the articles of the invention are prepared by traditional polymer processing methods comprising: injection molding, sheet extrusion, profile extrusion, blown film extrusion, melt lamination, compression molding, or any combination thereof.

In some embodiments, the polymeric articles of the invention are: construction components for buildings, clean rooms, or data centers; parts or tools used in clean rooms; fabric coatings, hoses and tubing; wires and cables; or combinations thereof.

It is known that some of the materials described above may interact in the final formulation, so that the components of the final formulation may be different from those that are initially added. The products formed thereby, including the products formed upon employing the composition of the invention in its intended use, may not be susceptible of easy description. Nevertheless, all such modifications and reaction products are included within the scope of the invention; the invention encompasses the composition prepared by admixing the components described above.

EXAMPLES

The invention will be further illustrated by the following examples, which sets forth particularly advantageous embodiments. While the examples are provided to illustrate the invention, they are not intended to limit it.

All of examples described below are prepared by compounding a polymer blend on a twin-screw extruder. Unless otherwise noted, these examples all use the same components: (i) a thermoplastic polyurethane, available commercially from The Lubrizol Corporation under the Estane® product line; (ii) a polyphosphonate homopolymer, commercially available from FRX Polymers, Inc.; and (iii) an inherently dissipative polymer, manufactured by The Lubrizol™ Corporation under Stat-Rite® product line. The blends in Example Set 2 also include additional performance additives. All of the components are compounded in the twin-screw extruder at conventional conditions. The resulting blends are then converted into sheets with a thickness of 30~40 mils using a single-screw extruder.

Example Set 1

A set of examples is prepared by blending (i) a thermoplastic polyurethane (TPU), (ii) a polyphosphonate homopolymer (PPH), and (iii) an inherently dissipative polymer (IDP), at various levels. The same components, described above, are used in each example. The formulation of each example is summarized in the table below:

TABLE I

| | Example Set 1 Formulations[1] | | | | | | | |
|---|---|---|---|---|---|---|---|---|
| | Comp Ex 1-1 | Comp Ex 1-2 | Comp Ex 1-3 | Ex 1-4 | Ex 1-5 | Ex 1-6 | Ex 1-7 | Ex 1-8 |
| TPU A[2] | 100.0 | 0.0 | 0.0 | 42.5 | 48.0 | 40.0 | 37.5 | 30.0 |
| TPU B[3] | 0.0 | 70.0 | 0.0 | 0.0 | 0.0 | 0.0 | 0.0 | 0.0 |

TABLE I-continued

Example Set 1 Formulations[1]

|  | Comp Ex 1-1 | Comp Ex 1-2 | Comp Ex 1-3 | Ex 1-4 | Ex 1-5 | Ex 1-6 | Ex 1-7 | Ex 1-8 |
|---|---|---|---|---|---|---|---|---|
| TPU C[4] | 0.0 | 0.0 | 70.0 | 0.0 | 0.0 | 0.0 | 0.0 | 0.0 |
| PPH[5] | 0.0 | 0.0 | 0.0 | 15.0 | 20.0 | 20.0 | 25.0 | 25.0 |
| IDP A[6] | 0.0 | 0.0 | 0.0 | 42.5 | 32.0 | 40.0 | 37.5 | 45.0 |
| IDP B[6] | 0.0 | 30.0 | 0.0 | 0.0 | 0.0 | 0.0 | 0.0 | 0.0 |
| IDP C[6] | 0.0 | 0.0 | 30.0 | 0.0 | 0.0 | 0.0 | 0.0 | 0.0 |
| Total | 100.0 | 100.0 | 100.0 | 100.0 | 100.0 | 100.0 | 100.0 | 100.0 |

[1] All formulation values in the table above are in parts by weight.
[2] TPU A is Estane® ETE50DS3, a commercially available polyester TPU, 49D Shore hardness.
[3] TPU B is Estane® 58212, a commercially available polyether TPU, 45D Shore hardness.
[4] TPU C is Estane® ZHF90AT0, a commercially available flame retardant polyether TPU, 91A Shore hardness, which includes a non-polyphosphonate flame retardant additive.
[5] PPH is FRX™ 100, a commercially available polyphosphonate homopolymer.
[6] IDP A is a salt modified TPU-based IDP where the salt is a sodium salt of an amidoalkanesulfonic acid. IDP B is a salt modified TPU-based IDP that uses the same TPU as IDP A, but a different salt, here a lithium salt of a bis(trifluoroalkyl) sulfonimide. IDP C is a salt modified TPU-based IDP that uses the same TPU as IDP A and IDP B, but a different salt than IDP A and IDP B, here a sodium salt of a trifluoromethane sulfonate. While these IDP's are not chemically identical, they do use the same base TPU component, a PEG-based polyurethane, and are considered to be valuable comparative examples that help demonstrate the benefits of the invention.

The compositions of the invention were tested to evaluate their flame retardancy. The testing methods used in this evaluation include ASTM E84, as well as UL 94 and the Limiting Oxygen Index (LOI) testing, which are industry accepted test procedures for determining the fire performance characteristics of various materials.

ASTM E84 evaluates the surface burning characteristics of building materials. ASTM E84 is a measure of the relative burning characteristics of building materials as measured by flame spread and smoke density developed. The test fixture is comprised of a test chamber or box approximately 2 feet wide×1 foot high and 25 feet long. The sample is mounted on the ceiling of the chamber. At one end of the chamber is the flame source, (two gas burners), delivering flame upward against the surface of the sample. The gas burners release heat at a rate of approximately 5,000 btu/min and create gas temperatures near the specimen surface of up to 1600° F. The test duration is 10 minutes. The maximum flame spread is measured. The smoke is directed to the end of the tunnel where it passes through an optical measuring device (photometer system). The measurements are compared to those of ½" thick, select grade red oak, which is rated as 100. A product with a flame spread rating of 25 and a smoke developed rating of 50 is commonly referred to as a 25/50 rated material. ASTM E84 is considered to be a medium-scale test and has been widely adopted for use by the building code authorities to regulate the use of interior finish materials.

UL 94 is a test for flammability of plastic materials for parts in devices and appliances. The small-scale test is divided into twelve flame categories. The V-0 (vertical mounted) flame rating indicates that the material was tested in the specified mounting position and found to burn at a rate less than a specified maximum. The ratings also indicate whether the specimen dripped flaming particles that ignited a combustible indicator (cotton) located below the specimen. A rating of V-0 is the best result that can be achieved in the testing, indicating the sample passed the UL 94 V-0 test conditions. For this testing, multiple specimens are used in the evaluation and it is noted that the ratings do not reflect all the differences between the examples. Specifically, Applicants note that some of the inventive examples clearly performance better in the UL 94 testing than some of the comparative examples (significantly fewer specimens may fail or show the undesired property in one example compared to another) but due to the rating scheme, these samples may still receive the same rating. This point is made to indicate that two samples that get the same rating do not necessarily provide identical performance and may be further distinguishable than the ratings may at first indicate. Still, the ratings are important guides to the performance of the examples and are included for that reason.

The Limiting Oxygen Index (LOI) test is widely used in research and quality control tool for determining the relative flammability of polymeric materials. A numerical index (the LOI) is defined as the minimum concentration of oxygen, in an atmosphere of oxygen and nitrogen, required to support downward burning of a vertically mounted test specimen. Hence, higher LOI values represent better flame retardancy. The test method is generally reproducible to an accuracy of ±0.5% and although originally designed for testing of plastics, the method has been used extensively for evaluating the relative flammability of rubbers, textiles, paper, coatings and other materials. The LOI testing present below followed ASTM D2863 procedures.

Haze and light transmission data is also reported for the examples. These results indicate how transparent the examples are at a specified thickness. The results were collected using ASTM D-1003. Haze gives an indication of the sample is transparent while light transmission gives an indication of translucence. The lower the haze result and/or the higher the light transmission result, the great the transparency of the sample.

In addition, for each sample ESD properties were evaluated as well. Surface and volume resistivity was measured using ASTM D257 at 50% relative humidity while static decay was measured using FTMS-101C at 12% relative humidity. The lower the resistance and the smaller the amount of time reported for the static decay rate, the more conductive the material.

The results for each example are summarized below:

TABLE II

Example Set 1 Results

| | Comp Ex 1-1 | Comp Ex 1-2 | Comp Ex 1-3 | Ex 1-4 | Ex 1-5 | Ex 1-6 | Ex 1-7 | Ex 1-8 |
|---|---|---|---|---|---|---|---|---|
| Flame Retardancy ASTM E94 | | | | | | | | |
| Flame Spread Index | — | 180 | 180 | — | — | — | — | 30 |
| Smoke Developed Index | — | 300 | 650 | — | — | — | — | 300 |
| Overall Rating (class) | — | III | Fail[3] | — | — | — | — | II |
| UL 94 | V-2 | V-2 | V-2 | V-0 | V-2 | V-2 | V-2 | V-2 |
| LOI | 25 | 24 | 27 | 26 | 27 | 26 | 29 | 23 |
| Transparency | | | | | | | | |
| Haze at 40 mil (%) | 0.94 | 1.74 | 2.0 | 28.0 | 3.7 | 3.9 | 4.1 | 26.8 |
| Light Transmittance at 40 mil (%) | 92.0 | 87.6 | 90.0 | 72.9 | 87.0 | 87.2 | 87.4 | 87.4 |
| ESD Properties | | | | | | | | |
| Surface Resistivity[1] (ohms/sq) | 1.8E+13 | 5.0E+09 | 5.4E+10 | 7.4E+09 | 2.5E+11 | 1.3E+11 | 2.0E+11 | 2.E+10 |
| Volume Resistivity[1] (ohm-cm) | >1E+13 | 5.0E+09 | 1.6E+09 | 4.6E+09 | 2.0E+11 | 1.6E+11 | 2.0E+11 | 2.E+10 |
| Static Decay Rate[2] (100 V-10 V, s) | >60 | 0.1 | 0.1 | 0.5 | 2.6 | 0.9 | 1.5 | 0.1 |

[1]Surface and Volume Resistivities are measured per ASTM D257 at 50% relative humidity
[2]The Static Decay Rate is measured per FTMS-101C at 12% relative humidity.
[3]The Fail result for example 1-3 indicates the example's smoke development index was too high and so it fell out of any performance rating for the test.

The results show that the compositions of the invention provide good flame retardancy and can also provide good transparency and ESD properties.

Example Set 2

A set of examples is prepared by blending (i) a thermoplastic polyurethane, (ii) a polyphosphonate homopolymer, (iii) an inherently dissipative polymer and (iv) up to two additional performance additives. The same components, described above, are used in each example, except that the IDP used in Example Set 2, is a different IDP than that used in Example Set 1. The formulation of each example is summarized in the table below:

TABLE III

Example Set 2 Formulations[1]

| | Ex 2-1 | Ex 2-2 | Ex 2-3 | Ex 2-4 |
|---|---|---|---|---|
| TPU A[2] | 30.00 | 29.75 | 34.75 | 19.25 |
| PPH[3] | 23.00 | 24.75 | 18.00 | 25.00 |
| IDP A[4] | 45.00 | 45.00 | 40.00 | 45.00 |
| FR1[5] | 2.00 | 0.00 | 0.00 | 0.00 |
| FR2[6] | 0.00 | 0.25 | 0.00 | 0.00 |
| FR3[7] | 0.00 | 0.00 | 7.00 | 0.00 |
| FR4[8] | 0.00 | 0.00 | 0.00 | 10.00 |
| MRA[9] | 0.00 | 0.25 | 0.25 | 0.75 |
| Total | 100.0 | 100.0 | 100.0 | 100.0 |

[1]All formulation values in the table above are in parts by weight.
[2]TPU A is Estane ® ETE50DS3, a commercially available polyester TPU having a Shore hardness of 49D.
[3]PPH is a commercially available polyphosphonate homopolymer.
[4]IDP A is a salt modified TPU-based IDP where the salt is a sodium salt of an amidoalkanesulfonic acid.
[5]FR1 is potassium fluoroborate, a commercially available flame retardant, a metal salt of a halogen borate.
[6]FR2 is KSS-FR, potassium salt of diphenyl sulfone sulfonate, commercially available flame retardant from Arichem LLC. .
[7]FR3 is FR-522, dibromoneopentyl glycol, a commercially available flame retardant from ICL Industrial products.
[8]FR4 is nitrogen and phosphorus containing complex masterbatch in thermoplastic polyurethane.
[9]MRA is a commercially available mold release agent not expected to have any impact on the compositions ESD properties, flame retardancy, but which was added to Examples 2-2 and 2-3 in order to facilitate additional processing of the examples. This component is listed here for completeness.

The examples described above are then tested to evaluate their flame retardancy and their electrostatic dissipative (ESD) properties using the same test methods described above. The results for each example are summarized below:

TABLE IV

Example Set 2 Results

| | Ex 2-1 | Ex 2-2 | Ex 2-3 | Ex 2-4 |
|---|---|---|---|---|
| Flame Retardancy | | | | |
| ASTM E94 | | | | |
| Flame Spread Index | — | 35 | 25 | 75 |
| Smoke Developed Index | — | 250 | 250 | 125 |
| Overall Rating (Class) | — | II | I | II |

TABLE IV-continued

Example Set 2 Results

|  | Ex 2-1 | Ex 2-2 | Ex 2-3 | Ex 2-4 |
|---|---|---|---|---|
| UL 94 | V-0 | V-1 | V-0 | — |
| LOI | 28 | 28 | 29 | — |
| Transparency | | | | |
| Haze at 40 mil (%) | 61 | 23 | 25 | — |
| Light Transmittance at 40 mil (%) | 83 | 83 | 84 | — |
| ESD Properties | | | | |
| Surface Resistivity[1] (ohms/sq) | 2.8E+10 | 4.E+10 | 2.E+10 | — |
| Volume Resistivity[1] (ohm-cm) | 4.9E+10 | 7.E+10 | 5.E+10 | — |
| Static Decay Rate[2] (1000V-10V, s) | 0.1 | 0.3 | 0.1 | — |

[1]Surface and Volume Resistivities are measured per ASTM D257 at 50% relative humidity
[2]The Static Decay Rate is measured per FTMS-101C at 12% relative humidity.

The results show that the compositions of the invention provide good flame retardancy and can also provide good transparency and ESD properties.

As used herein, and unless otherwise defined, the expression "substantially free of" may mean that and amount that does not materially affect the basic and novel characteristics of the composition under consideration, in some embodiments, it may also mean no more than 5%, 4%, 2%, 1%, 0.5% or even 0.1% by weight of the material is questions is present, in still other embodiments, it may mean that less than 1,000 ppm, 500 ppm or even 100 ppm of the material in question is present.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values, ppm values and parts values are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

We claim:

1. A composition comprising a blend of:
   (i) 20% to 80% by weight of the composition of a thermoplastic polyurethane component; and
   (ii) 15% to 40% by weight of the composition of a polyphosphonate polymer component, and
   (iii) a salt-modified inherently dissipative polymer component, wherein the salt-modified inherently dissipative polymer component is selected from thermoplastic polyurethane polymers, polyolefin polyether copolymers, thermoplastic polyester elastomers, polyether block amide elastomer, or combinations thereof, and wherein the salt-modified inherently dissipative polymer component comprises about 0.10 to about 0.75 parts by weight of metal-containing salt based on 100 parts by weight of the salt-modified inherently dissipative polymer component.

2. The composition of claim 1 further comprising a secondary flame retardant additive.

3. The composition of claim 1 wherein the composition:
   meets a Class II or better rating as measured according to ASTM E84;
   (ii) meets a V1 or better rating as measured according to UL94;
   (iii) has a haze of lower than 50% at 40 mil thickness as measured according to ASTM D-1003;
   (iv) has a surface resistivity of between 1E6 and 1E12 ohms/sq as measured at 50% relative humidity according to ASTM D-257; or
   (v) any combination thereof.

4. The composition of claim 1 wherein component (i), the thermoplastic polyurethane component, has a hardness of no more than 70D, as measured by ASTM D2240.

5. The composition of claim 1 wherein component (i), the thermoplastic polyurethane component, comprises a thermoplastic polyurethane made by reacting (a) at least one polyol intermediate with (b) at least one diisocyanate and (c) at least one chain extender;
   wherein the thermoplastic polyurethane is present at 20-80 weight percent of the overall composition.

6. The composition of claim 1 wherein component (ii), the polyphosphonate component, comprises a homopolymer of a phosphonate, a copolymer of two or more phosphonates, or a combination thereof.

7. The composition of claim 1 wherein component (iii), the salt-modified inherently dissipative polymer component, comprises:
   (a) a chain extended low molecular weight polyoxirane;
   (b) a chain extended low molecular weight polyester polyol derived from at least one dialkylene glycol and at least one dicarboxylic acid, ester, or anhydride; or
   (c) a combination thereof.

8. The composition of claim 7 where the chain extended low molecular weight polyoxirane is a chain extended polyether oligomer, wherein said polyether oligomer comprises a homopolymer or copolymer of polyethylene glycol, polypropylene glycol, or combination thereof.

9. The composition of claim 8 wherein the homopolymer or copolymer of polyethylene glycol comprises a homopolymer of ethylene glycol having a weight average molecular weight of about 500 to about 2500 or a copolymer of ethylene glycol and at least one other glycol where the copolymer has a weight average molecular weight of about 500 to about 5000.

10. The composition of claim 1 wherein the composition further comprises one or more additional performances additives, said additional performance additives comprising waxes, process aids, antioxidants, heat stabilizers, UV stabilizers, hydrolysis stabilizers, colorants, flame retardants, ionic additives, or any combination thereof.

11. A method of producing a composition comprising a blend of:
   (i) 20% to 80% by weight of the composition of a thermoplastic polyurethane component; and
   (ii) 15% to 40% by weight of the composition of a polyphosphonate polymer component and,
   (iii) a salt-modified inherently dissipative polymer component, wherein the salt-modified inherently dissipative polymer component is selected from thermoplastic polyurethane polymers, polyolefin polyether copolymers, thermoplastic polyester elastomers, polyether block amide elastomer, or combinations thereof, and wherein the salt-modified inherently dissipative polymer component comprises about 0.10 to about 0.75 parts by weight of metal-containing salt based on 100 parts by weight of the salt-modified inherently dissipative polymer component;

wherein said method comprises the steps of:
(I) mixing components (i), (ii), and (iii) in an internal mixing device.

12. A shaped polymeric article comprising the flame retardant thermoplastic polyurethane composition of claim 1.

13. The shaped polymeric article of claim 12 wherein said article is prepared by traditional polymer processing methods comprising: injection molding, sheet extrusion, profile extrusion, blown film extrusion, melt lamination, compression molding, or any combination thereof.

14. The shaped polymeric article of claim 12, wherein said article comprises: packaging materials for electronic components or parts; construction components for buildings, clean rooms, or data centers; parts or tools used in clean rooms; fabric coatings, hoses and tubing; wires and cables; or combinations thereof.

15. A composition comprising a blend of:
(i) 20% to 80% by weight of the composition of a thermoplastic polyurethane component; and
(ii) 15% to 40% by weight of the composition of a polyphosphonate polymer component, wherein the polyphosphonate polymer component is substantially free of phosphine oxide-based materials; and
(iii) a salt-modified inherently dissipative polymer component, wherein the salt-modified inherently dissipative polymer component is selected from thermoplastic polyurethane polymers, polyolefin polyether copolymers, thermoplastic polyester elastomers, polyether block amide elastomer, or combinations thereof, and wherein the salt-modified inherently dissipative polymer component comprises about 0.10 to about 0.75 parts by weight of metal-containing salt based on 100 parts by weight of the salt-modified inherently dissipative polymer component;

wherein the blend is substantially free of halogen atoms, halogen containing salts, and/or other halogen containing compounds.

16. The composition of claim 15 wherein the composition further comprises a secondary flame retardant additive selected from brominated diols, brominated mono-alcohols, brominated ethers, brominated esters, brominated phosphates, and combinations thereof.

17. The composition of claim 1, wherein the salt-modified inherently dissipative polymer component comprises a salt selected from sodium salt of an amidoalkanesulfonic acid; a lithium salt of styrene sulfonic acid; a copolymer of a lithium salt of an amidoalkanesulfonic acid and acrylic acid; a terpolymer of a lithium salt of an amidoalkanesulfonic acid, a lithium salt of styrene sulfonic acid, and acrylic acid; a copolymer of a sodium salt of an amidoalkanesulfonic acid and acrylic acid; a terpolymer of a sodium salt of an amidoalkanesulfonic acid, a sodium salt of styrene sulfonic acid, and acrylic acid or combinations thereof.

* * * * *